Figure 1:
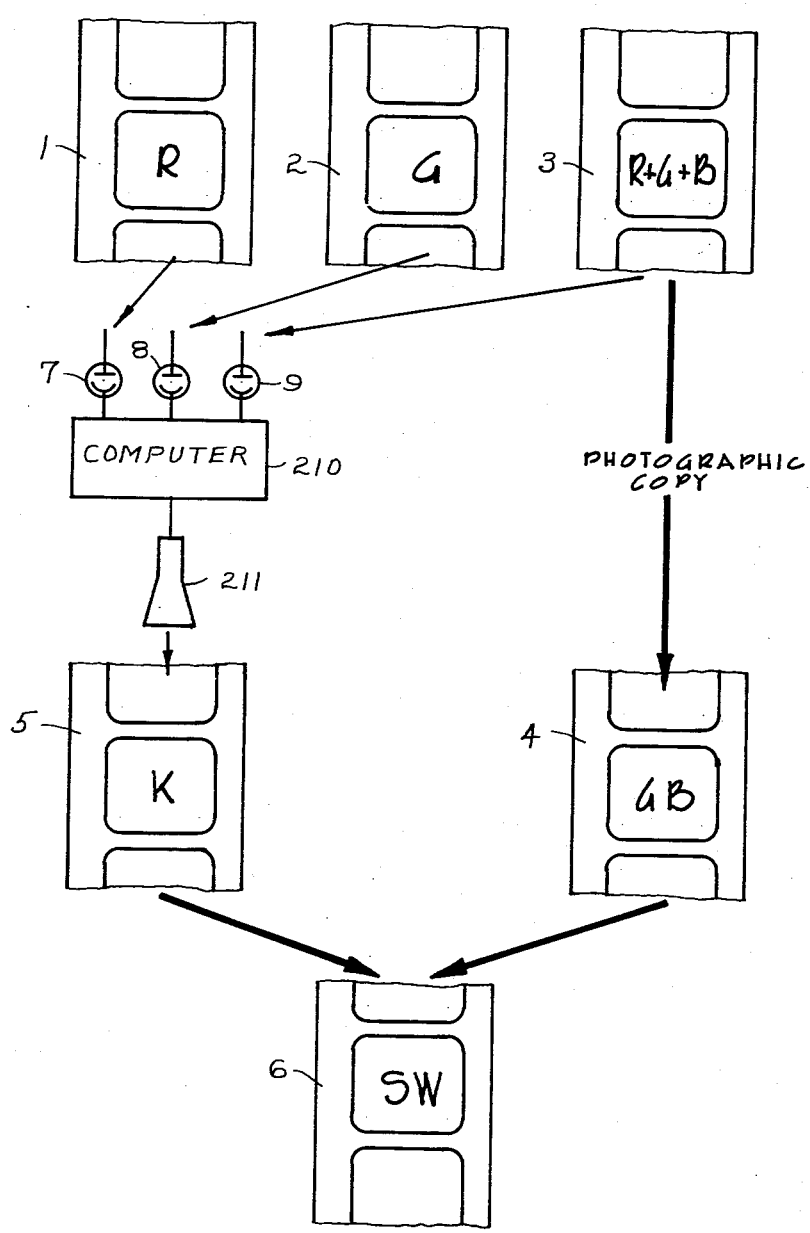

Feb. 14, 1961 E. GRETENER 2,972,011
METHOD FOR PROCESSING A SUBTRACTIVE
MOTION PICTURE FILM
Filed Jan. 27, 1958 4 Sheets-Sheet 2

INVENTOR.
Edgar Gretener
BY
Pierce Scheffler & Parker
Attorneys

United States Patent Office 2,972,011
Patented Feb. 14, 1961

2,972,011

METHOD FOR PROCESSING A SUBTRACTIVE MOTION PICTURE FILM

Edgar Gretener, Ottenweg 25, Zurich, Switzerland, assignor to Dr. Edgar Gretener A.-G., Zurich, Switzerland Filed Jan. 27, 1958, Ser. No. 711,479

Claims priority, application Switzerland Sept. 29, 1954

9 Claims. (Cl. 178—5.2)

This invention is related to a method for processing a subtractive motion picture film.

The present application is a continuation in part of my copending application Ser. No. 537,492, filed on September 29, 1955, and now abandoned.

With customary subtractive color films distortion of color hue, color saturation and brightness occur which are caused by the absorption characteristic of the employed dyes. As is well-known the absorption overlaps into the spectral range of the adjoining color components so that the color component recordings influence each other. A certain part of this color distortion is non-linear, i.e. depends upon brightness.

To remedy these shortcomings I have suggested in my copending United States patent application No. 528,709 of August 16, 1955, now abandoned, to employ a subtractive film, which besides the customary three colored layers provides a fourth black-and-white layer. The density of the black-and-white layer, which in the following will be referred to as "grey-content" density, must at every image point be equal to the smallest of the three color component densities of a customary three color process, whereas the densities of the remaining three colored layers hereinafter referred to as "color residue densities" will be equal to the corresponding color component density of the customary process reduced by the density of the black-and-white layer. In order to obtain correct representation of colors with such a film it is necessary that the density of the black-and-white layer ("grey content" density) must comply strictly with the above indicated requirement, i.e. it must correspond at every image point to the density of the smallest of the three color component densities. Consequently the grey content layer will only control the brightness of the picture at that point, whereas the color residue densities will alone be responsible for color reproduction.

It has proved impossible to produce this black-and-white density recording by purely photographic means. It can only be achieved by electrical point-to-point scanning of the three color separation images and by electrical selection of the largest of the three color components, respectively. A motion picture film copy obtained by a pure electric scanning method, however, shows a certain degradation of sharpness and gradation.

It is the object of the present invention to remedy this shortcoming. It is directed to a method for processing a subtractive motion picture film copy providing a black-and-white recording and three color residue recordings wherein the density of the black-and-white recording at every image point is equal to the density corresponding to the greatest of the three color components, and wherein the densities of the color residue recording are equal to the corresponding color component density minus said black-and-white density. Such a process according to the invention is characterized in particular by the feature that from a master picture recording obtained by photographing a colored object there is obtained by purely photographic process steps a picture registration which in the density distribution would correspond to a combination of the effect of the three color components, and that the said registration is corrected point-by-point by correcting values which are superimposed in the photographic process and which are obtained by point-by-point scanning of the master and conversion of the resulting color component signals, in such a manner that the correcting values correspond to the deviation of the purely photographically obtained combination of the effect of the three color components from the correct magnitude of the black-white registration.

Figure 2:
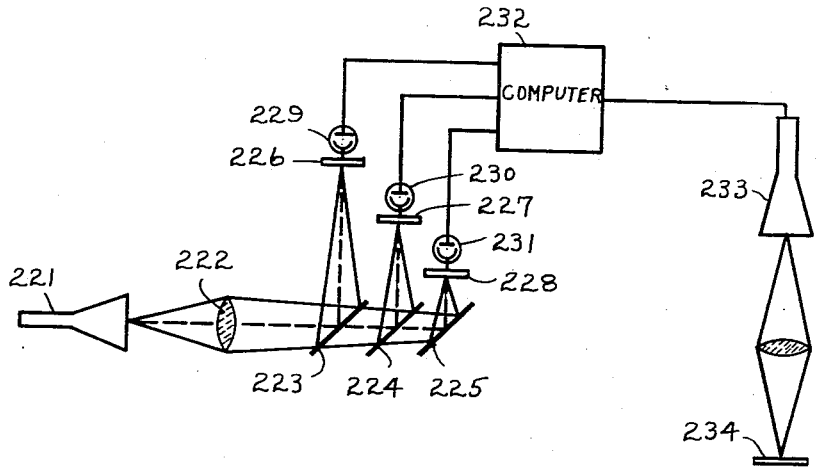
Figure 3:
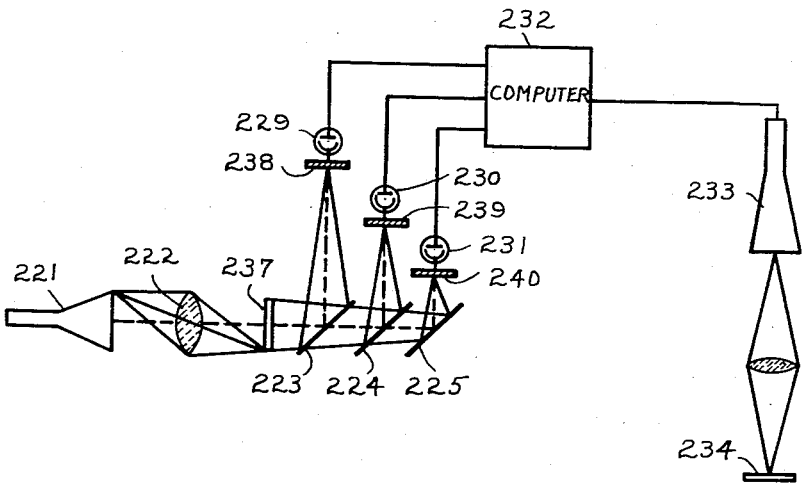

Embodiments of the present invention will now be explained in the following with the aid of the attached drawings, where Fig. 1 shows a flow-chart of the process, whereas Figs. 2 and 3 schematically represent two electrical scanning arrangements for producing the correction values.

Figure 4:
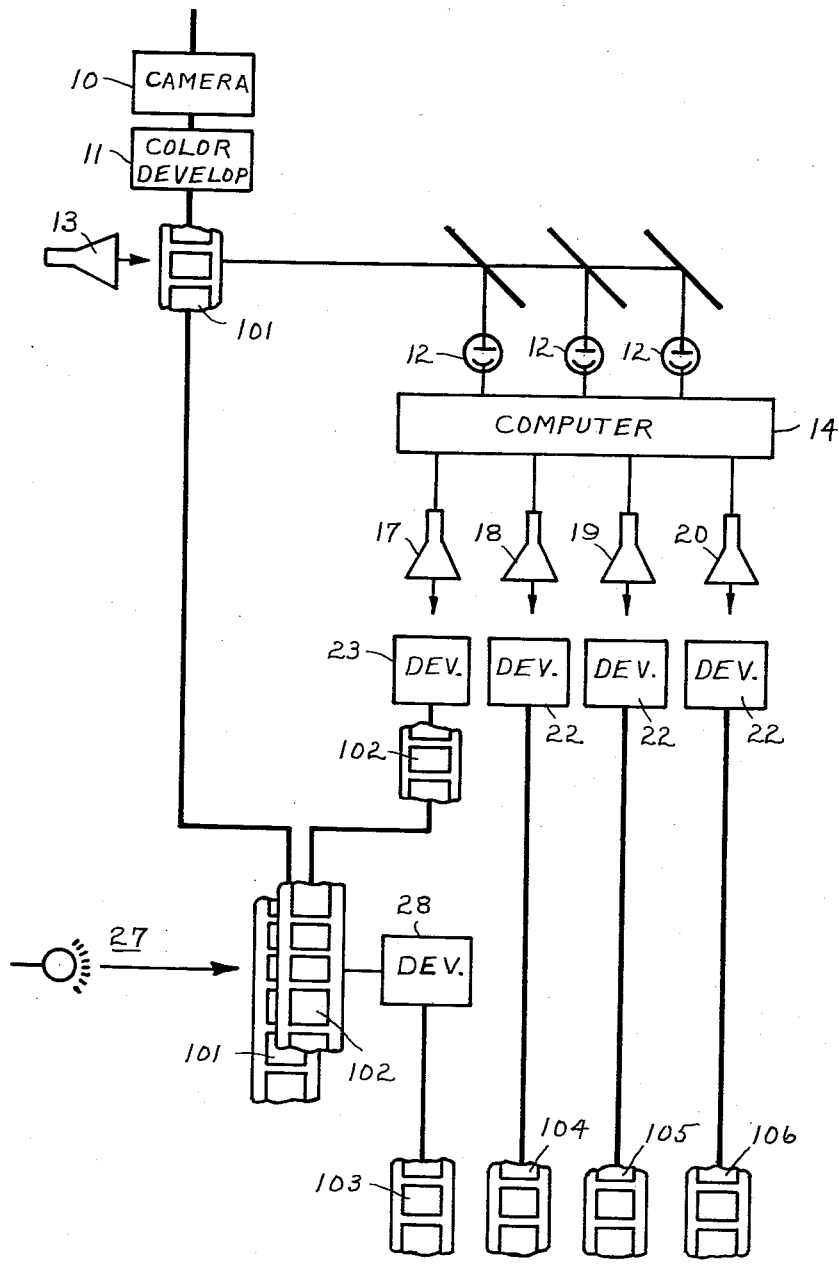
Figure 5:
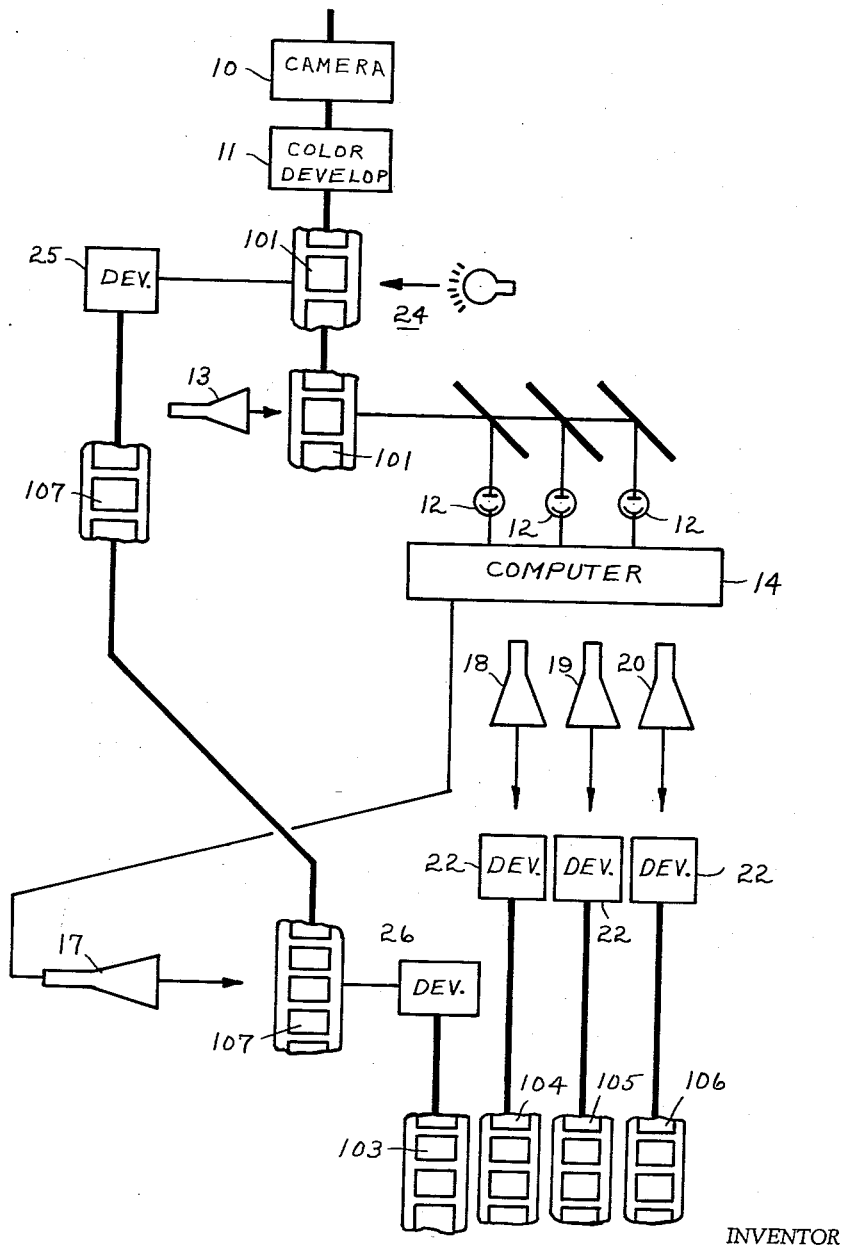

Figs. 4 and 5 represent flow-charts of further modifications of the inventive process.

Fig. 1 represents a flow-chart which schematically represents the successive steps of a process according to the present invention. By way of example, the process starts from the three black-and-white color separation images 1, 2 and 3. The distribution of transparency of the first one corresponds to the red color component (R), the transparency of the second one to the green color component (G). In contradistinction to the customary pick-up processes the third separation image does not correspond to the blue color component, but to the sum of all three color components $(R+G+B)$. This may easily be achieved by employment of a pick-up filter with suitable spectral transparency. In this manner a black-and-white image is directly obtained the distribution of density of which corresponds to the combined effect of the three color components. From this image basic image 4 is printed, i.e. obtained by a purely photographic process which thus contains the geometric image content without degradation. The density, however, does not correspond to the density required to control the intensity of the color residue image. The correct black-and-white density at every point must correspond not to the sum of the three color components but to the largest of the three color components, respectively.

For this purpose a correction image 5 is produced by electrical scanning, the distribution of density of which corresponds to the necessary correction value for bringing the density of the basic image 4 to the correct density of the black-and-white image. The correction image, by way of example, is produced by employing a flying spot scanner shown in Fig. 1, which scans point-by-point the three color separation images 1, 2 and 3. The outputs of three photocells 7, 8 and 9 are connected to a computer device 210. In the case shown the value of the blue component must first be determined, which is effected by subtracting the red and green signals from the (red+green+blue) signal. An output voltage is then derived from the three color component signals which corresponds to the required correction of the density of the basic picture 4. It serves to control a kinescope 211 by which the correction image 5 is printed upon the motion picture film.

The value of the necessary density of the correction image at every point is given by the following considerations. The density of the black-and-white layer of the copy must be:

$$D = \lg(T_0/\hat{T})$$

where $\hat{T}$ is the transparency of the largest of the three color components and $T_0$ is the maximum transparency of the layer. The density of the basic image 4 which is considered as a negative is:

$$D_4 = \lg(\Sigma T/3K_0)$$

where $\Sigma T$ is the sum of the transparencies of the three color components and where $K_0$ is a constant to take into consideration the other conditions of the printing and developing process. If now the density of the correction image 5 is:

$$D_5 = \lg(3\hat{T}/\Sigma T)$$

the addition of the densities of the superimposed images 4 and 5 is:

$$D_4 + D_5 = \lg(\Sigma T/3K_0) + \lg(3\hat{T}/\Sigma T)$$
$$= \lg(\Sigma T/3K_0) \cdot (3\hat{T}/\Sigma T)$$
$$= \lg(\hat{T}/K_0)$$

If now the black-and-white layer 6 is printed through the superimposed basic image and correction image the black-and-white density is obtained as $$D = \lg \text{Exp} = \lg K \cdot (K_0/\hat{T}) = D_0 + (\lg T_0/\hat{T})$$

where K is a further constant of the process and $D_0$ is the basic density of the black-and-white layer.

The correction image is reproduced with reduced sharpness. This is a consequence of the limited band width of the electric scanning device. As a consequence the correction will be incorrect at transition points or along edges with a great step in contrast or brightness or color, as here the band width of the scanning device and the transients will come in. Furthermore the correction image has a small maximum density. This is obvious from the above indicated relation for the density of the correction image, which is equal to the logarithm of the ratio of the largest of the three color components to the sum of the three color components. This ratio will never be larger than 1 and never be smaller than ⅓, so that the maximum density of the correction image will never exceed a value 0.48. In contradistinction the basic image correctly reproduces sharpness and the geometric image content. At the same time the density range corresponds to that of the original. The geometric contents of the image do not depend upon the accuracy of electric scanning. The reduced sharpness of the correction image furthermore prevents that slight deviations from exact register cause disturbances on the release print.

The process according to the invention thus permits to treat by purely photographic steps all those qualities of the image which are not related to color, such as particularly sharpness, contours and the geometric image content. The deviation of black-and-white density entained by this process is corrected by the electrically derived correction image and is brought to its correct value. Preferably the density of the basic image at every point is made equal to the sum of transparencies of the three color components, as in this case the correction image may easily be determined from the value of the color components.

In the preceding an embodiment has been discussed wherein the basic image is produced from a separation image which was taken through a suitable combination of pick-up filters, the transparency of which at each point corresponds to the sum of the three color components $(R+G+B)$.

It is, however, likewise possible to produce the basic image by successive printing of the customary black-and-white recorded color separation images R, G and B. It is furthermore possible to start from one of the customary three-layer films. In this case the basic image is obtained by printing three colored color separation images contained on a common colored film with three suitable lights of different color. Preferably the correction image is produced by electronic scanning in the same way, respectively, where arrangements may be employed as shown by Figs. 2 and 3.

Fig. 2 shows a flying-spot scanner where the screen of the flying spot tube 221 is imaged upon the three color separations 226, 227 and 228 through a lens 222 and an arrangement of semi-transparent mirrors 223, 224 and 225. Photocells 229, 230 and 231 are located behind the respective color separation images and connected to computer 232 which serves to calculate the correction factor. It thus has at the same time to form the sum of the three color components to select the largest component at every moment and to form the quotient of these two values. If the color separation $(R+G+B)$ shown in Fig. 1 is employed the device must furthermore be capable of forming the blue component by subtracting $R+G$ from $(R+G+B)$. The signal obtained at the output terminals controls kinescope 233 which is projected upon film 234.

Fig. 3 shows a similar arrangement which, however, does not employ three black-and-white color separations, but a color film 237. In order to separate the spectral components three color filter 238, 239 and 240 must be located in front of the three photocells. All the other parts of the arrangement of Fig. 3 correspond to those of Fig. 2.

As has already been explained it is possible to determine the correction density from the ratio of the sum of the three color components to the largest of these components. It is thus necessary to select first this largest of the three components. For this purpose a rectifier circuit may be employed as it has been prescribed in my patent application No. 350,668 of April 23, 1953, now United States Letters Patent No. 2,842,609 granted July 8, 1958. By means of a variable-m$\mu$ amplifier a signal may be obtained which corresponds to the ratio of the sum of the three color components to the selected largest component.

It is, however, likewise possible to determine the necessary correction density in another way. The required correction is determined by the position of the color to be reproduced in a color coordinate system or color triangle in such a manner that the necessary correction density is positively defined for any color point. The color coordinates of any image point may be derived from the color component signals obtained at the output of the three photocells and may be employed to deflect a cathode ray so that the position of the luminous spot on the screen represents the position of the color point in a corresponding color coordinate system. For this purpose the three color component signals must be normalized, i.e. multiplied by the same factor e.g. so that their sum is equal to unity. As a particularly well defined correction density value corresponds to any position of the color point the correction density may be derived from the position of the spot of the screen. This, by way of example, is possible by recording a transparent mask in front of the screen having a corresponding heterogeneous distribution of densities and controlling the tube to produce a spot of constant brightness. Then the value of the light passing through the grey mask and impinging upon a photocell is determined by the density of the mask at the respective point of the screen.

In the example of the inventive process given above the black-white density is obtained by simultaneously copying a "basic picture" and a "correction picture," the basic picture being obtained by purely photographic processes steps from the exposed film and thus having unimpaired sharpness, while the geometric picture content, such as sharpness and contours, is not falsified. In view of the above mentioned impossibility of obtaining the black-white density with strict accuracy and faultlessly by purely photographic means, however, its density corresponds only to a combination of the effect of the three color components, for example the total thereof. The correcting picture on the other hand has reduced sharpness and truth of contour, and also a low density range, and is obtained by point-by-point electric scanning of the three color component registrations and by corresponding conversion of the resulting signals. In its density distribution it corresponds to the required correction of the density of the basic picture, in order to obtain the correct density of the black-white registration in simultaneous copying. For this purpose in the above example, an intermediate film with the basic picture and an intermediate film with the correcting picture are made from the masters obtained by exposure, and these intermediate films are then superimposed to print the copy.

However, the present invention also contains the generic idea that from the master image recording obtained by photographing a colored object there is produced by purely photographic process steps a picture registration which in density distribution would correspond to a combination of the effect of the three color components, and which is then corrected point-by-point over the picture, the correction values being obtained by point-by-point scanning of the master and conversion of the resulting color component signals, in such a manner that the correction values correspond to the deviation of the purely photographically obtained combination of the effect of the color components from the correct magnitude of the black-white registration.

Two further modifications embodying the principle will now be described in greater detail with reference to Figs. 4 and 5.

Fig. 4 shows a diagram of a process illustrated schematically. The process uses as master a three-color film, for example a three-color negative 101, which is obtained by photographing 10 the colored object, followed by color development 11. This colored master is scanned point-by-point in a scanning device of the type described for example in connection with Fig. 3, for example with the aid of the flying-spot scanner 13, so that at the outlet of the three photoelectric cells 12 three color component signals, corresponding to the color components, are obtained. In the computer 14 these are subjected to selection and conversion, whereby four signals are obtained, which are fed to the four cathode ray tubes 17, 18, 19 and 20. As illustrated, the tubes 18, 19 and 20 are controlled by the three color residue signals. The resulting screen pictures are transferred by individual exposures to the intermediate films 104, 105 and 106, on which after development 22 the residual color densities $rR$, $rG$ and $rB$ are obtained for further use in the process. Instead of producing the three residual color density registrations on three separate intermediate films, they can of course also be produced on a three-layer film as three superimposed colored registration. The production and further use of these residual color densities is not a subject of the present application, but is described in detail for example in the specification of my patent application Ser. No. 528,709 filed on August 16, 1955.

In order to produce the intermediate film 103 carrying the black-white density registration, the master 101 is copied. The copying light used in the copying stage 27 and the sensitivity of the film to be exposed are so selected that in the direct copying of the master 101 on to the intermediate film the density of the registration obtained would correspond at each point of the picture to a prescribed combination of the three color pictures in the original 101, i.e. to a combination of the three color components of the master. A self-suggesting combination to be prescribed would for example be for the density at each point of the picture to correspond to the total of the three color transparencies. Any other desired combination of the three color transparencies can of course also be formed; in every case, however, the density of the copy is at every point a defined function of the three color components of the original. In the case illustrated of the production of the intermediate film from a colored three-layer negative, not only must the spectral distribution of the copying light and the spectral sensitivity of the film, but also the reciprocal spectral overlapping of the three color layers be taken into account.

According to the invention, however, the original 101 is not copied directly on to the intermediate film 103, but in the exposure stage 27 a correcting film 102 is additionally interposed between the master 101 and the copy. This correcting film 102, serving as mask, serves to correct the density that would be obtained in the copy by direct copying of the original, so that after development 28 the intermediate film 103 has the correct black-white density. If therefore for example the conditions during copying, i.e. the spectral distribution of copying light and sensitivity, are so selected that without the use of the mask 102 the density of the intermediate film 103 at every point would correspond to the sum of the three color components, then the density of the correcting mask at each point of the picture must be equal to the ratio of the sum of the three color transparencies to the greatest color transparency at the point of the picture, as is explained above. Film 102 thus corresponds to the "correction picture."

The density required for the correcting mask is calculated in the computer apparatus 14 from the three color component signals and transferred to the film by exposure by means of the cathode ray tube 17, so that after development 23 the correct correcting mask 102 is then obtained. Thus, before copying the master 101 on to the intermediate film 103, the correcting film 102 must be produced by photoelectric scanning 12 of the master 101, conversion of the signals 14, exposure by means of the cathode ray tube 17, and development 23. This is usually done simultaneously with the production of the color residue films 104, 105 and 106.

If the copying operation 27 is controlled otherwise, so that the density in the intermediate film 103 during copying without a mask does not correspond to the sum, but to a different function of the three color components, the density of the correcting mask 102 must once again be so determined that it becomes the density of the copy on the correction, i.e. gives the correct black-white density. This is always possible if the density produced by the exposure can be indicated as an unambiguous function of a combination of the three color components.

According to the invention therefore there is produced by a purely photographic process, a registration which would not correspond to the correct value of the black-white density, and this photographic copying operation is corrected by values calculated electronically and brought to the correct value. In the photographic side of the process the geometric picture content, contours, picture shape, and so on are in this way obtained unfalsified. The phrase "photographic steps of the process" is intended to denote those steps in the process in which the picture content is contained and remains in a substantial manner in a picture layer, for example in developing, or is totally transferred to another layer, for example in copying, so that it is not impaired or changed in its geometrical form. The phrase "electric steps of the process" on the other hand is intended to denote those in which the picture content is converted into electric picture signals, for example by point-by-point scanning. In consideration of the restricted resolving power of the scanning operation, a marked loss of sharpness is to be expected. The geometric shape is also no longer clearly given, since it depends on the accuracy of the line pattern used for the scanning and exposure.

Instead of the electric-optical scanning arrangement shown in the present example, it is of course also possible to use a mechanical scanning device, which during the scanning produces electrical color component signals and after the conversion re-converts these into a photographic registration. Mechanical scanning devices of this type are for example known in the technique of producing printing plates for color printing, and therefore need not be explained in greater detail.

For the better differentiation of the photographic and electrical branches of the process, the purely photographic branches of the process are indicated in the accompanying drawings in thick lines, the electrical branches of the process, in which the picture content is reproduced only by electric signals, by thin lines, and exposure beams by double lines.

Fig. 5 shows a different form of performance of the process of the invention, in which the starting point is the colored original 101 obtained from the camera 10 after development 11. It is of course also possible to start, not with a colored three-layer original (positive or negative), but with three separately produced color separations, for example registered in black-and-white, or with one separation with the sum of the color components ($B+R+G$), as is described above. In the process illustrated in Fig. 5 the original is electro-optically scanned and the color component signals obtained by scanning at the photoelectric cells 12 are converted in the computer apparatus 14. The resulting color residue signals are fed to the cathode ray tubes 18, 19 and 20, so that after development 22 the three color residue density films 104, 105 and 106 are again obtained. By copying 24 and development 25 the so-called basic picture is now obtained in an intermediate film 107 from the master 101. This basic picture film preferably has black-white registration, the density of which at each point of the picture is a function of the three color components of the master 101. This density preferably corresponds at each point of the picture to the sum of the three color components, in which case it is also known as a sum film. It thus corresponds to the "basic picture" mentioned above.

In the computing apparatus 14 a fourth signal is in turn produced, which corresponds in magnitude to the correction which is required to obtain from the density of the basic picture the density of the correct black-white density film. If the density of the basic picture film corresponds to the sum of the three color components, the signal delivered to the tube 17 must in turn be equal at each point of the picture to the ratio of the sum of the three transparencies to the greatest transparency. The picture produced on the screen of the tube 17 is now copied on to the film 107, while at the same time the basic picture film is placed after the style of a mask on the film to be exposed. The density distribution thus actually obtained by copying is obtained as the joint action of the brightness distribution of the basic picture film and of the brightness distribution on the screen of the tube 17, the latter corresponding to the necessary correction of the basic picture to the correct black-white density. Instead of the tube 17, it is possible to use, if desired, a device working with mechanical means (for example mirror scanning and light valve). After the development 26, the now correct black-white density film 103 is obtained.

Once again therefore, in order to produce the correct black-white density registration by purely photographic steps of the process from the master obtained from the camera, a registration is produced which at each point of the picture would correspond to a combination of the three color components, preferably the sum thereof, and this copying process is corrected by values which are obtained by electro-optical scanning of the master, in such a manner that the thus corrected copying process supplies the correct black-white density registration.

As compared with the process described with respect to Fig. 1, the processes set out in Figs. 4 and 5 are distinguished in that it is not necessary in the production of the final black-white density registration to use both a substantial intermediate film with a basic picture and a substantial intermediate film with a correcting picture. On the contrary, in the case illustrated in Fig. 4, only the correcting picture is present in substantial form, namely on the intermediate film 102. A separate intermediate film for the basic picture is not necessary, the latter being constituted during copying by the light passing through the master 101, simultaneously taking into account the spectral sensitivity of the copying film. In the case illustrated in Fig. 5 on the other hand an intermediate film with the basic picture is present in substantial form, but there is no substantial intermediate film with the correcting picture, the latter being constituted by the picture produced on the screen of the tube 17.

Both latter cases, however, likewise make use of the principle of the present invention, namely the parallel employment, for the purpose of producing a correct black-white density registration, of a purely photographic branch of the process and a branch of the process working with electrical means, the photographic branch of the process having the purpose of obtaining the geometric picture content unfalsified, while the electric branch of the process serves to correct the photographic branch in such a manner that the correct black-white density is obtained.

It is obvious that the principle of the present invention is not restricted to the production of a black-white density film. On the contrary it is also possible to employ the same in other problems of color photography. Thus for example it is possible in a mask process to determine only the additional masks required for the purpose of color correction by electrical conversion of color component signals obtained by scanning the color separations, while the (basic) color separations to be corrected by these electrically produced masks are in turn produced by purely photographic steps of the process, and thus undergo no deterioration of the geometric picture content. The principle of the so-called "unsharp masks" can thus also be applied here, the color separation to be masked being obtained photographically, and the unsharp mask electrically.

The present invention is only directed to producing the necessary black-and-white (grey content) density which is necessary to control the intensity (brightness) of the color residue image, in a subtractive motion picture film which provides a black-and-white picture and a color residue image. Production of the color residue image is not the object of the present application as it is without importance if this color residue image is produced by a customary three-layer film or is produced by an imbibition process, where successively three dye images are printed on an imbibing layer.

What I claim is:

1. The method of producing a black-and-white recording for use as a brightness control in a multi colored reproduction process comprising three color components and said black-and-white recording, said method comprising the steps of photographically producing from said color components a basic black-and-white recording having a density at each image point corresponding to the sum of the transparencies of said color components, electrically spot scanning said color components to produce a correction black-and-white recording having a density at each and every point equal to the ratio of the sum of the transparencies of said color components to the largest of said transparencies at said point and combining said basic and correction black-and-white recordings to produce a composite black-and-white recording.

2. The method as defined in claim 1 wherein said basic recording is produced by printing of three color separation images recorded on a common colored film by three lights of corresponding color, respectively.

3. The method as defined in claim 1 wherein said basic recording is produced from a color separation image taken through a selected combination of pick-up filters, the transparency of such separation image being at every image point equal to the sum of the three color components.

4. The method as defined in claim 1 wherein said basic recording is produced from three color separation images and said correction recording is produced by simultaneously and synchronously scanning said three color separation images and electrically calculating the correction density from the three color signals thus obtained.

5. The method of producing a neutral color separation image in a multi-color subtractive reproduction process, which comprises the steps of deriving from a colored original by purely photographic steps a basic image which at each picture point of the original has a density value corresponding to the combined effect of the color components of the original at such point, said density values being incorrect for the neutral color separation image but which conserve the geometrics of the original, scanning said original with respect to the color components thereof in a point-by-point manner to produce a correction image which at each such point has a density corresponding to the required correction of the basic image to obtain the correct density of the neutral color separation image, and combining said basic image with said correction image to produce said neutral color separation image.

6. The method of producing a neutral color separation image in a multi-color subtractive reproduction process, which comprises the steps of deriving from a colored original by purely photographic steps a basic image which at each picture point of the original has a density value corresponding to the sum of the color components of the original at such point, said density values being incorrect for the neutral color separation image but which conserve the geometrics of the original, scanning said original with respect to the color components thereof in a point-by-point manner to produce a correction image which at each such point has a density value corresponding to the ratio of the sum of said color components to the greatest of said color components, and combining said basic image with said correction image to produce said neutral color separation image.

7. The method of producing a neutral color separation image in a multi-color subtractive reproduction process, which comprises the steps of deriving from a colored original by purely photographic steps a multi-color master basic image which at each picture point thereof has a density value corresponding to the sum of the color components of the original at such point, said density values being incorrect for the neutral color separation image but which conserve the geometrics of the original, scanning said master basic image in a point-by-point manner to produce a correction image which at each such point has a density value corresponding to the ratio of the sum of said color components to the greatest of said color components, superimposing said correction image upon said master basic image, and producing therefrom said neutral color separation image.

8. The method as defined in claim 7 wherein said master basic image and said correction image are both produced upon a film, said films being then superimposed, and wherein said neutral color separation image is then produced as a third film by copying said superimposed films.

9. The method as defined in claim 7, wherein said master basic image is copied photographically onto an intermediate film and wherein said correction image is produced upon the screen of a cathode ray tube, the light from said screen being superimposed upon said intermediate film to produce said neutral color separation image.

References Cited in the file of this patent

UNITED STATES PATENTS

| | | |
|---|---|---|
| 2,607,845 | Clark | Aug. 19, 1952 |
| 2,691,696 | Yule | Oct. 12, 1954 |
| 2,710,889 | Tobias | June 14, 1955 |
| 2,766,319 | Hall | Oct. 9, 1956 |
| 2,808,453 | Haynes | Oct. 1, 1957 |